United States Patent
Norris et al.

(10) Patent No.: US 7,009,030 B2
(45) Date of Patent: Mar. 7, 2006

(54) HIGH-MELTING WAX USEFUL FOR SINTERING METALS

(75) Inventors: Gene Kelly Norris, West Chester, OH (US); Rajiv Manohar Banavali, Rydal, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/811,009

(22) Filed: Mar. 26, 2004

(65) Prior Publication Data

US 2004/0198946 A1    Oct. 7, 2004

Related U.S. Application Data

(60) Provisional application No. 60/459,411, filed on Apr. 1, 2003.

(51) Int. Cl.
*C08G 69/26* (2006.01)
*C07C 231/02* (2006.01)
*C07C 233/00* (2006.01)

(52) U.S. Cl. .................. 528/332; 528/310; 528/312; 528/335; 528/336

(58) Field of Classification Search ............... 528/332, 528/310, 312, 336, 335
See application file for complete search history.

(56) References Cited

U.S. PATENT DOCUMENTS

| | | | |
|---|---|---|---|
| 2,130,523 A | 9/1938 | Carothers et al. | |
| 5,154,881 A | 10/1992 | Rutz et al. | |
| 5,256,185 A | 10/1993 | Semel et al. | |
| 5,484,469 A | 1/1996 | Rutz et al. | |
| 5,744,433 A * | 4/1998 | Storstrom et al. | 508/454 |
| 6,395,687 B1 * | 5/2002 | Hanejko | 508/243 |
| 6,396,687 B1 | 5/2002 | Sun et al. | |
| 2004/0198946 A1 * | 10/2004 | Norris et al. | 528/332 |
| 2004/0198994 A1 * | 10/2004 | Norris et al. | 554/37 |

FOREIGN PATENT DOCUMENTS

| | | |
|---|---|---|
| DE | 2730175 A | 1/1978 |
| GB | 557875 | 12/1943 |
| JP | 1993214246 A | 8/1993 |

* cited by examiner

*Primary Examiner*—P. Hampton Hightower
(74) *Attorney, Agent, or Firm*—Kenneth Crimaldi

(57) ABSTRACT

A wax containing the reaction product of: (a) a $C_6$–$C_{12}$ linear dicarboxylic acid; and (b) a diamine of formula $H_2N(CH_2)_nNH_2$, wherein n is an integer from 2 to 6, and the molar ratio of the $C_6$–$C_{12}$ linear dicarboxylic acid to the diamine is from 0.97 to 1.06.

9 Claims, No Drawings

HIGH-MELTING WAX USEFUL FOR SINTERING METALS

CROSS REFERENCE TO RELATED PATENT APPLICATIONS

This is a non-provisional application of prior pending U.S. provisional application Ser. No. 60/459,411 filed Apr. 01, 2003.

The present invention relates to a high-melting wax useful for sintering metals.

Promold™ 450 wax has been sold commercially for many years as a lubricant for metal sintering applications. It is made by reaction of approximately 24% to 28% sebacic acid, 61% to 65% stearic acid and 13% to 15% ethylene diamine. Promold™ 450 wax begins to melt at a temperature of approximately 450° F. (232° C.). A wax having a higher melting point would be desirable for some metal sintering applications.

The problem addressed by this invention is to provide a wax having a higher melting point.

STATEMENT OF THE INVENTION

The present invention is directed to a wax containing the reaction product of: (a) a $C_6$–$C_{12}$ linear dicarboxylic acid; and (b) a diamine of formula $H_2N(CH_2)_nNH_2$, wherein n is an integer from 2 to 6, and the molar ratio of said $C_6$–$C_{12}$ linear dicarboxylic acid to said diamine is from 0.97 to 1.06.

DETAILED DESCRIPTION OF THE INVENTION

Unless otherwise specified, temperatures are in degrees centigrade (° C.), and references to percentages (%) are by weight.

Preferably, the wax comprises a reaction product of a $C_8$–$C_{10}$ linear dicarboxylic acid and a diamine in which n is 2 or 3. In one preferred embodiment of the invention, the linear dicarboxylic acid and the diamine contain saturated alkyl or alkylene groups, i.e., alkyl or alkylene groups that contain no carbon-carbon multiple bonds. Preferably, the alkyl or alkylene group is unsubstituted. Preferably, the wax comprises a reaction product of sebacic acid and ethylene diamine.

Preferably, the molar ratio of dicarboxylic acid to diamine reactants is from 0.99 to 1.03, and most preferably from 1.00 to 1.02. If the numbers of moles of carboxylic acid and amine are not approximately equal, the resulting wax will have residual acidity or basicity which is undesirable in metal sintering applications. Residual basicity is especially undesirable. Preferably, the acid number of the wax, in mg KOH/g, is no more than 12, more preferably no more than 10, more preferably no more than 9, and most preferably no more than 8; preferably the acid number is no less than 4, more preferably no less than 6. Preferably, the base number of the wax, in mg KOH/g, is no more than 8, preferably no more than 6, more preferably no more than 4, and most preferably no more than 3.

In one embodiment of the invention, the condensation reaction between the reactants used to produce the wax is performed at a temperature from 240° C. to 300° C., preferably from 250° C. to 290° C., and most preferably from 260° C. to 280° C. In another preferred embodiment of the invention, the dicarboxylic acid and the diamine are allowed to react first, preferably at a temperature from 120° C. to 170° C., more preferably from 125° C. to 150° C. Preferably, when the dicarboxylic acid is a solid at ambient temperature, the dicarboxylic acid is melted prior to introduction of diamine, and the exothermic reaction is then controlled within the aforementioned ranges. After the reaction is substantially complete the temperature increased to the range from 240° C. to 300° C., preferably from 250° C. to 290° C., and most preferably from 260° C. to 280° C. In one preferred embodiment of the invention, the reaction is carried out with sub-surface addition of the diamine, i.e., the diamine is added below the surface of reaction mixture. The reaction may be performed at atmospheric pressure, or at an elevated pressure. Preferably the reaction mixture is liquid. Optionally, a solvent is used that can be removed by distillation when the reaction is complete. Preferred solvents are those which are not reactive with either aliphatic carboxylic acids or aliphatic amines, for example, aromatic hydrocarbon solvents. Preferably, a catalyst is used, for example, an acid catalyst, including phosphoric and sulfuric acid, a basic catalyst, including tertiary amines, dehydrating agents, including $POCl_3$, and metal salts, including CsCl. Optionally an antioxidant is added to the reaction mixture to prevent discoloration of the wax. Preferably, the wax is ground to produce an average particle size less than 10 microns, more preferably less than 5 microns, and most preferably less than 4 microns. The bulk density of the ground wax preferably is at least 0.4 g/mL, most preferably at least 0.5 g/mL.

The present invention is further directed to a iron-based powder composition useful for sintering. The iron-based powder composition comprises the wax of this invention and an iron-based powder. Information on iron-based powders used for sintering can be found, for example, in U.S. Pat. Nos. 5,484,469 and 6,395,687.

EXAMPLES

Example 1

A flask was charged with sebacic acid (71.64 g, 0.5 moles) and ethylene diamine (30.01 g, 0.5 moles) was added slowly to the sebacic acid. When all of the ethylene diamine had been added, the mixture was heated to melt the reaction mixture (approximately 140° C.). The mixture was heated gradually to maintain it in the liquid state until a temperature of 265° C. was attained. The product was allowed to cool and solidify. The product started melting at 489° F. (254° C.).

Example 2

A flask was charged with sebacic acid (404.20 g, 2 moles) and BHT (2,6-di-tert-butyl-4-methylphenol) (2.26 g). The flask was cooled in an ice-water bath and ethylene diamine (120.04 g, 2 moles) was added slowly to the sebacic acid. When all of the ethylene diamine had been added, the mixture was heated to melt the reaction mixture. The mixture was heated gradually to maintain it in the liquid state until a temperature of 270° C. was attained. The product was allowed to cool and solidify. The product started melting at 265° C.

The invention claimed is:

1. A composition comprising an iron-based powder and a wax comprising a reaction product of:
   (a) a $C_6$–$C_{12}$ linear dicarboxylic acid; and
   (b) a diamine of formula $H_2N(CH_2)_nNH_2$, wherein n is an integer from 2 to 6, and a molar ratio of said $C_6$–$C_{12}$ linear dicarboxylic acid to said diamine is from 0.97 to 1.06.

2. The composition of claim 1 in which said $C_6$–$C_{12}$ linear dicarboxylic acid is a $C_8$–$C_{10}$ linear dicarboxylic acid, and n is 2 or 3.

3. The composition of claim 2 in which a molar ratio of said $C_8$–$C_{10}$ linear dicarboxylic acid to said diamine is from 0.99 to 1.03.

4. The composition of claim 3 in which said $C_8$–$C_{10}$ linear dicarboxylic acid is sebacic acid, and said diamine is ethylene diamine.

5. The composition of claim 4 in which a molar ratio of said $C_8$–$C_{10}$ linear dicarboxylic acid to said diamine is from 1.00 to 1.02.

6. The composition of claim 1 in which a molar ratio of said $C_6$–$C_{12}$ linear dicarboxylic acid to said diamine is from 0.99 to 1.03.

7. The composition of claim 6 in which said $C_0$–$C_{12}$ linear dicarboxylic acid contains a saturated alkylene group, and said diamine contains a saturated alkylene group; and n is 2 or 3.

8. The composition of claim 7 in which a molar ratio of said $C_6$–$C_{12}$ linear dicarboxylic acid to said diamine is from 1.00 to 1.02.

9. The composition of claim 8 in which said $C_6$–$C_{12}$ linear dicarboxylic acid is a $C_8$–$C_{10}$ linear dicarboxylic acid.

* * * * *